United States Patent
An et al.

(10) Patent No.: US 9,604,324 B2
(45) Date of Patent: Mar. 28, 2017

(54) REFRIGERATOR AND MANUFACTURING METHOD THEREOF

(71) Applicant: SAMSUNG ELECTRONICS CO., LTD., Suwon-si (KR)

(72) Inventors: Jae Koog An, Gwangju (KR); Jeong Hun Shin, Siheung (KR); Byung Su Kim, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 13/947,569

(22) Filed: Jul. 22, 2013

(65) Prior Publication Data

US 2013/0298405 A1 Nov. 14, 2013

Related U.S. Application Data

(63) Continuation of application No. 13/859,344, filed on Apr. 9, 2013.

(30) Foreign Application Priority Data

Apr. 10, 2012 (KR) .................. 10-2012-0037205

(51) Int. Cl.
  *B23P 15/26* (2006.01)
  *F25D 17/00* (2006.01)
  (Continued)

(52) U.S. Cl.
  CPC .............. *B23P 15/26* (2013.01); *F25C 5/005* (2013.01); *F25D 17/00* (2013.01); *F25D 23/00* (2013.01);
  (Continued)

(58) Field of Classification Search
  CPC ...... B23P 15/26; F25C 5/005; F25C 2400/10; F25D 23/12; F25D 23/006; F25D 23/064;
  (Continued)

(56) References Cited

U.S. PATENT DOCUMENTS

| 2010/0319373 | A1 | 12/2010 | Jeong et al. |
| 2011/0162404 | A1* | 7/2011 | Shin .................. F25D 23/006 62/340 |
| 2011/0162406 | A1 | 7/2011 | Shin |

FOREIGN PATENT DOCUMENTS

| CN | 102116562 | 7/2011 |
| JP | 54-44458 | 3/1979 |

(Continued)

OTHER PUBLICATIONS

Machine Translation of KR 20-2008-0005809, Refrigerator, Yang, Gyu Kim et al. May 28, 2007.*

(Continued)

*Primary Examiner* — Jacob Cigna
*Assistant Examiner* — Lee A Holly
(74) *Attorney, Agent, or Firm* — Staas & Halsey LLP

(57) ABSTRACT

A method of manufacturing a refrigerator comprises preparing an inner case including an ice making chamber and an opening; preparing an outer case to be coupled to an outside of the inner case; preparing a refrigerant pipe assembly including a refrigerant pipe having at least a portion to be disposed in the ice making chamber to supply cooling energy, and a refrigerant pipe insulator to insulate the refrigerant pipe; inserting the refrigerant pipe assembly into the opening of the inner case in an inward direction from the outside of the inner case such that a portion of the refrigerant pipe insulator is disposed in the ice making chamber, and a remaining portion of the refrigerant pipe insulator is disposed between the inner case and the outer case; and foaming a body insulator between the inner case and the outer case, thereby supporting the refrigerant pipe insulator by the body insulator.

5 Claims, 7 Drawing Sheets

(51) Int. Cl.
*F25D 23/00* (2006.01)
*F25C 5/00* (2006.01)
*F25D 23/06* (2006.01)
*F25D 17/04* (2006.01)
*F25D 17/06* (2006.01)

(52) U.S. Cl.
CPC ......... *F25D 23/006* (2013.01); *F25D 23/064* (2013.01); *F25C 2300/00* (2013.01); *F25C 2400/10* (2013.01); *F25D 17/04* (2013.01); *F25D 17/065* (2013.01); *F25D 23/061* (2013.01); *F25D 2201/126* (2013.01); *Y10T 29/49359* (2015.01)

(58) Field of Classification Search
CPC ........ F25D 17/00; F25D 23/00; F25D 23/061; F25D 2201/126; F25D 17/065; Y10T 29/49359
See application file for complete search history.

(56) References Cited

FOREIGN PATENT DOCUMENTS

| | | |
|---|---|---|
| JP | 11-311461 | 11/1999 |
| JP | 2000-121218 | 4/2000 |
| JP | 2002-156176 | 5/2002 |
| JP | 2007-303775 | 11/2007 |
| JP | 2008-267630 | 11/2008 |
| JP | 2011-80690 | 4/2011 |
| KR | 10-2008-0015341 | 2/2008 |
| KR | 20-2008-0005809 | 12/2008 |
| KR | 20080005809 U * | 12/2008 ............. F25D 11/00 |
| KR | 10-2010-0137637 | 12/2010 |
| KR | 10-2011-0080104 | 7/2011 |

OTHER PUBLICATIONS

Kilicarslan et al.; "A comparative study of water as a refrigerant with some current refrigerants"; Jul. 18, 2005; International Journal of Energy Research; Int. J. Energy Res. 2005; 29:947-959.*
First Action Interview Pilot Program Pre-Interview Communication mailed Jun. 30, 2015 in U.S. Appl. No. 13/859,344.
International Search Report mailed Jul. 9, 2013 in corresponding International Application No. PCT/KR2013/002896.
U.S. Appl. No. 13/859,344, filed Apr. 9, 2013, Jae Koog An, Samsung Electronics Co., Ltd.
Extended European Search Report dated Oct. 26, 2015 in corresponding European Patent Application No. 13163195.4.
U.S. Office Action issued Sep. 3, 2015 in copending U.S. Appl. No. 13/859,344.
Notice of Allowance mailed Jul. 1, 2016 in copending U.S. Appl. No. 13/859,344.
Chinese Patent Office Action issued Apr. 1, 2016 in corresponding Chinese Patent Application No. 201310123374.8.
Second Office Action, dated Sep. 12, 2016, in corresponding Chinese Application No. 201310123374.8 (20 pp.).

* cited by examiner

REFRIGERATOR AND MANUFACTURING METHOD THEREOF

CROSS-REFERENCE TO RELATED APPLICATIONS

This application is a continuation of U.S. application Ser. No. 13,859,344 filed Apr. 9, 2013, which claims the priority benefit of Korean Patent Application No. 10-2012-0037205 filed on Apr. 10, 2012 in the Korean Intellectual Property Office, the disclosure of which is incorporated herein by reference.

BACKGROUND

1. Field

Embodiments of the present disclosure relate to a refrigerator with a direct cooling type ice making structure.

2. Description of the Related Art

Generally, a refrigerator is a home appliance including a storage chamber to store food, and a cold air supplier to supply cold air to the storage chamber in order to keep food fresh. To satisfy consumer demand, such a refrigerator may be provided with an ice making chamber and an ice maker, for production of ice.

Structures for supplying cold air to an ice making chamber in order to produce ice may be classified into an indirect cooling type structure and a direct cooling type structure. In the indirect cooling type structure, cold air generated at an evaporator is fed to the ice making chamber via a separate duct. On the other hand, in the direct cooling type structure, cold air is directly generated within the ice making chamber. In particular, in the direct cooling type structure, a portion of a refrigerant pipe may extend into the ice making chamber, and a separate heat exchanger may be installed in the ice making chamber. Otherwise, the refrigerant pipe may contact an ice making tray such that the ice making tray directly functions as a heat exchanger.

Such a direct cooling type ice making structure may have advantages of high ice making rate and elimination of a feeding duct structure in that cold air is directly generated within the ice making chamber. In such a direct cooling type structure, however, it may be necessary to prevent formation of frost on the refrigerant pipe caused by temperature difference. In addition, a task to extend a portion of the refrigerant pipe into the ice making chamber is required.

SUMMARY

Therefore, it is an aspect of the present disclosure to provide an ice making chamber assembly structure capable of not only achieving effective insulation of a refrigerant pipe, thereby preventing formation of frost on the refrigerant pipe, but also firmly fixing the refrigerant pipe in a refrigerator having a direct cooling type ice making structure in which a portion of the refrigerant pipe extends into an ice making chamber.

Additional aspects of the disclosure will be set forth in part in the description which follows and, in part, will be apparent from the description, or may be learned by practice of the disclosure.

In accordance with one aspect of the present disclosure, a refrigerator includes an inner case including an ice making chamber formed in an interior of the inner case, an outer case coupled to an outside of the inner case, a body insulator foamed between the inner case and the outer case, a refrigerant pipe having at least a portion disposed in the ice making chamber, to supply cooling energy to the ice making chamber, and a refrigerant pipe insulator enclosing the refrigerant pipe, to insulate and support the refrigerant pipe, wherein the inner case further includes an opening allowing the refrigerant pipe insulator to extend therethrough, wherein the refrigerant pipe insulator extends through the opening such that a portion of the refrigerant pipe insulator is disposed in the ice making chamber, and a remaining portion of the refrigerant pipe insulator is disposed between the inner case and the outer case, and wherein the refrigerant pipe insulator is supported by the body insulator foamed between the inner case and the outer case.

The refrigerant pipe insulator may be supported by an outer surface of the inner case around the opening.

The refrigerant pipe insulator may be supported by an inner surface of the outer case.

The refrigerator may further include a support case disposed at a rear side of the ice making chamber within the ice making chamber, the support case having a support passage formed in an interior of the support case, to receive the refrigerant pipe insulator. The refrigerant pipe insulator may be inserted into the support passage of the support case, to be supported by the support case.

The refrigerant pipe may include at least one bent portion. The at least one bent portion may be supported by the refrigerant pipe insulator while being enclosed by the refrigerant pipe insulator, to prevent the refrigerant pipe from moving relative to the refrigerant pipe insulator.

The refrigerant pipe insulator may include a first insulator section, and a second insulator section coupled to the first insulator section. The refrigerant pipe may be interposed between the first insulator section and the second insulator section.

The refrigerator may further include at least one clamp member coupled to the first insulator section and the second insulator section, to couple the first insulator section and the second insulator section. The first insulator section and the second insulator section may be coupled by the at least one clamp member and the body insulator foamed between the inner case and the outer case.

The refrigerator may further include a blowing fan disposed beneath the refrigerant pipe insulator, to force air present in the ice making chamber to flow. A guide may be formed at a bottom portion of the refrigerant pipe insulator, to forwardly guide air rising from space beneath the refrigerant pipe insulator toward the refrigerant pipe insulator.

In accordance with another aspect of the present disclosure, a refrigerator includes an inner case including an ice making chamber formed in an interior of the inner case, an outer case coupled to an outside of the inner case, a body insulator foamed between the inner case and the outer case, a refrigerant pipe having at least a portion disposed in the ice making chamber, to supply cooling energy to the ice making chamber, a refrigerant pipe insulator including a first insulator section and a second insulator section coupled to the first insulator section, the refrigerant pipe being interposed between the first insulator section and the second insulator section, and at least one clamp member coupled to the first and second insulator sections, to couple the first and second insulator sections, wherein at least a portion of each of the first and second insulator sections is disposed in the inner case, and a remaining portion of each of the first and second insulator sections is disposed between the inner case and the outer case, and wherein the first and second insulator sections are kept in a fixed state by the at least one clamp member and the body insulator.

The first insulator section may be coupled to a top portion of the second insulator section.

The first insulator section may include a first accommodation groove formed on an outer peripheral surface of the first insulator section, to accommodate the refrigerant tube. The second insulator section may include a second accommodation groove formed on an outer peripheral surface of the second insulator section at a position corresponding to the first accommodation groove, to accommodate the refrigerant tube. The first and second accommodation grooves may form an accommodation space to accommodate the refrigerant pipe.

The refrigerator may further include a blowing fan disposed beneath the refrigerant pipe insulator, to force air present in the ice making chamber to flow. A guide may be formed at a bottom portion of the second insulator section, to forwardly guide air rising from space beneath the second insulator section toward the second insulator section.

In accordance with another aspect of the present disclosure, a refrigerator includes an inner case including an ice making chamber formed in an interior of the inner case, an outer case coupled to an outside of the inner case, a body insulator foamed between the inner case and the outer case, a refrigerant pipe having at least a portion disposed in the ice making chamber while extending through the inner case, to supply cooling energy to the ice making chamber, and a refrigerant pipe insulator enclosing at least a portion of the refrigerant pipe, wherein the refrigerant pipe insulator includes an inserted portion disposed in the inner case, and a fixed portion disposed between the inner case and the outer case, wherein the inner case includes an opening allowing the refrigerant pipe insulator to extend therethrough, wherein the fixed portion includes a first support surface supported by the body insulator, and a second support surface supported by an outer surface of the inner case around the opening, and wherein the fixed portion is supported by the body insulator foamed between the inner case and the outer case and the outer surface of the inner case around the opening.

The fixed portion may further include a third support surface supported by an inner surface of the outer case. The fixed portion may be supported by the inner surface of the outer case.

The fixed portion may have a length corresponding to a distance between the outer surface of the inner case and an inner surface of the outer case.

In accordance with still another aspect of the present disclosure, a method of manufacturing a refrigerator includes preparing an inner case including an ice making chamber and an opening communicating with the ice making chamber, preparing an outer case to be coupled to an outside of the inner case, preparing a refrigerant pipe assembly including a refrigerant pipe having at least a portion to be disposed in the ice making chamber so as to supply cooling energy to the ice making chamber, and a refrigerant pipe insulator to insulate the refrigerant pipe, inserting the refrigerant pipe assembly into the inner case in an inward direction from the outside of the inner case such that a portion of the refrigerant pipe insulator is disposed in the ice making chamber, and a remaining portion of the refrigerant pipe insulator is disposed between the inner case and the outer case, and foaming a body insulator between the inner case and the outer case, thereby supporting the refrigerant pipe insulator by the body insulator.

The preparing the refrigerant pipe assembly may include preparing a first insulator section and a second insulator section to be coupled to the first insulator section so as to form the refrigerant pipe insulator, arranging the refrigerant pipe between the first insulator section and the second insulator section, and coupling the first insulator section and the second insulator section.

The preparing the refrigerant pipe assembly may further include preparing at least one clamp member to be coupled to the first and second insulator sections so as to couple the first and second insulator sections, and coupling the at least one clamp member to the first and second insulator sections.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings.

Figure 1:
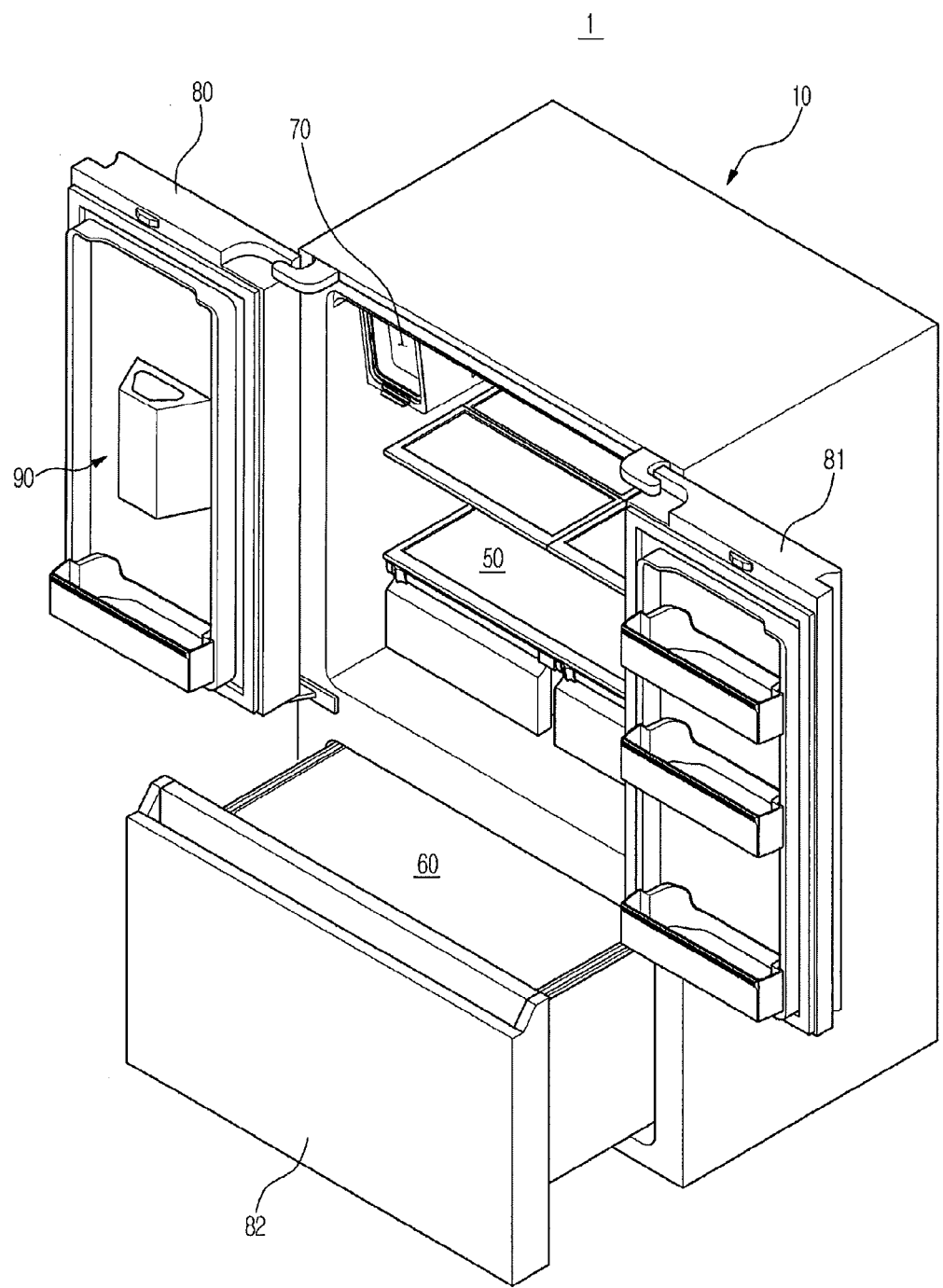
FIG. 1 is a perspective view illustrating a refrigerator according to an embodiment of the present disclosure.
Figure 2:
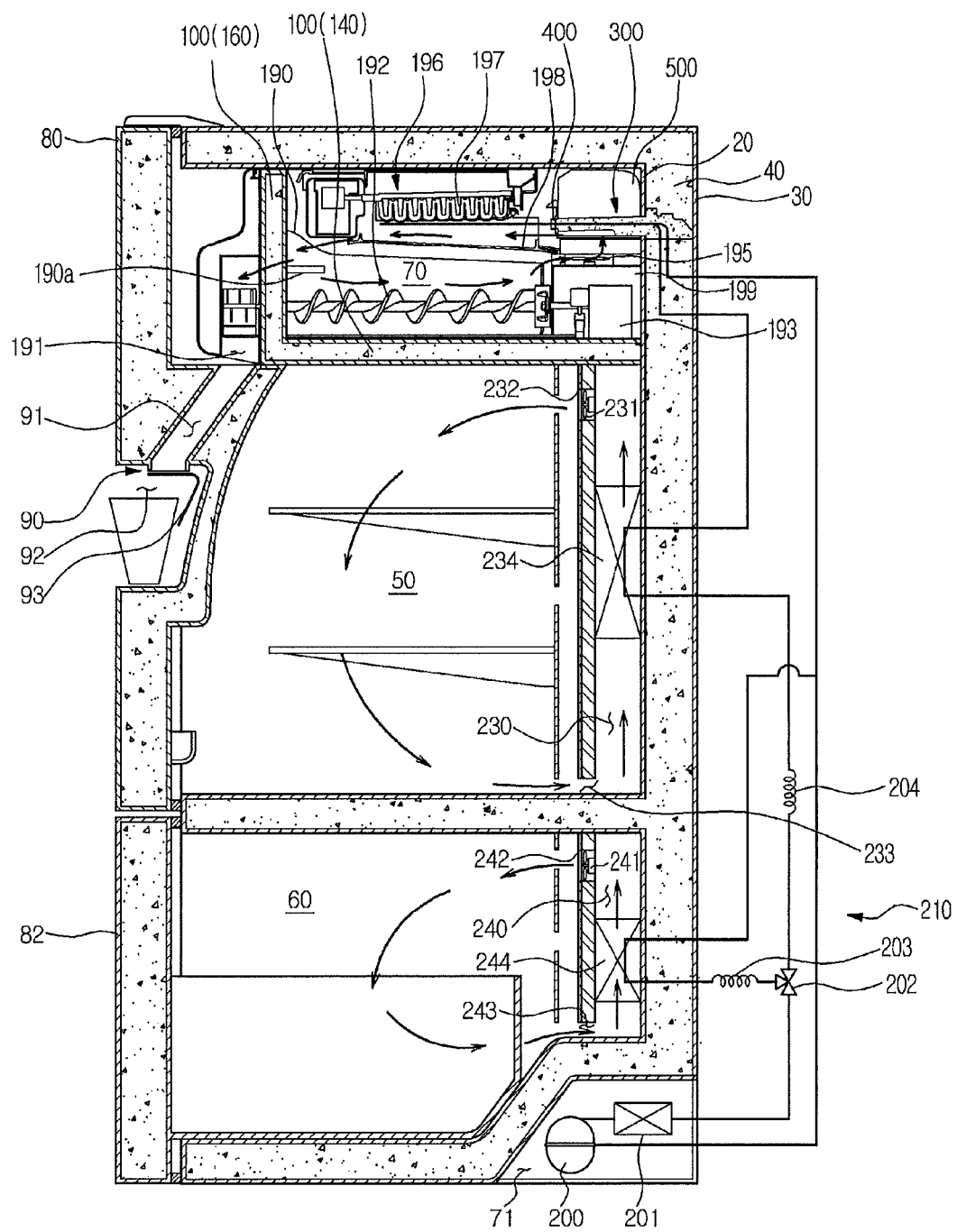
FIG. 2 is a schematic sectional view illustrating the refrigerator shown in FIG. 1.
Figure 3:
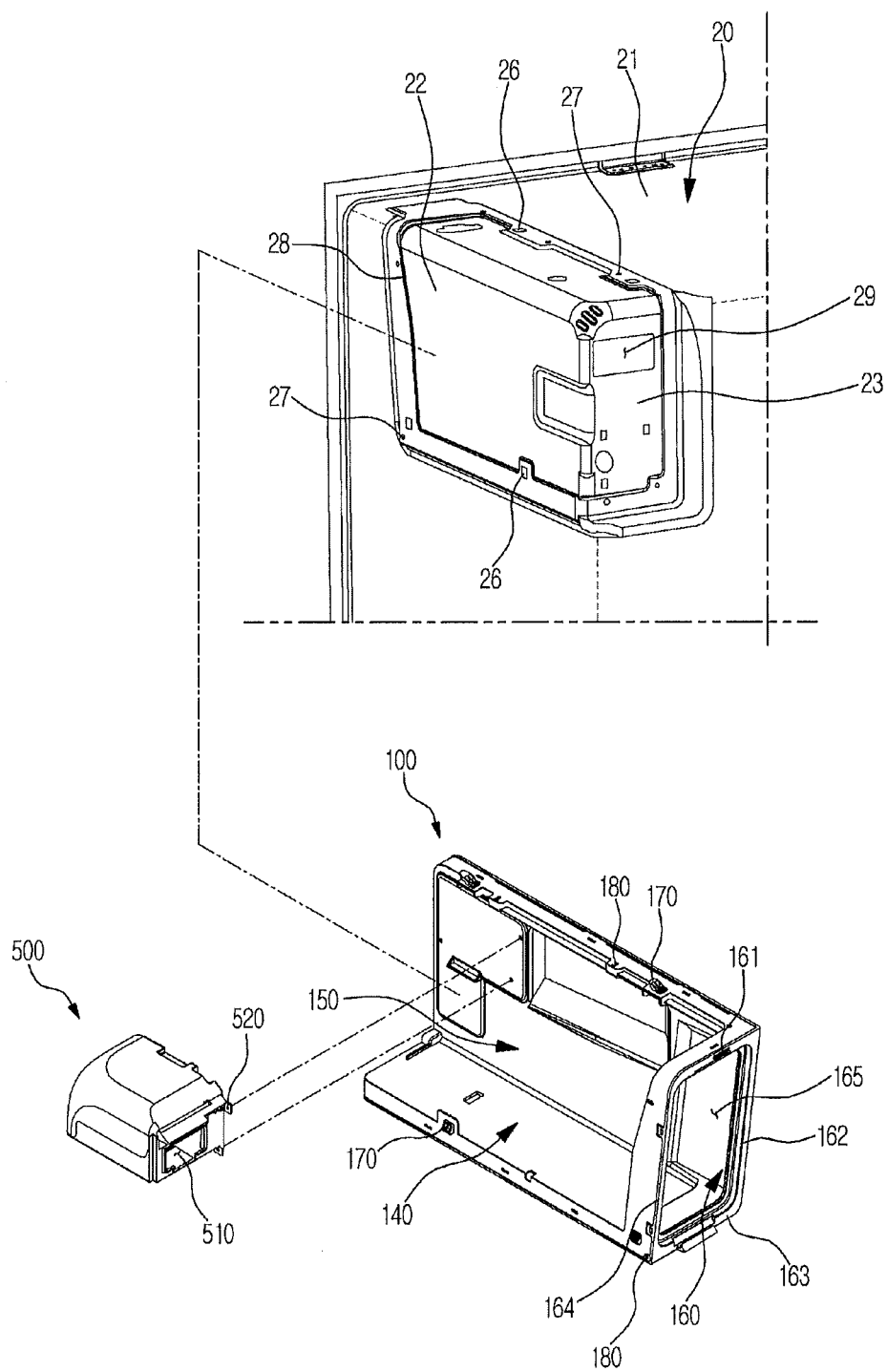
FIG. 3 is an exploded perspective view illustrating an assembly structure of an ice making chamber of the refrigerator shown in FIG. 1.

FIG. 1 is a perspective view illustrating a refrigerator according to an embodiment of the present disclosure. FIG. 2 is a schematic sectional view illustrating the refrigerator shown in FIG. 1. FIG. 3 is an exploded perspective view illustrating an assembly structure of an ice making chamber of the refrigerator shown in FIG. 1. In FIG. 2, arrows indicate flows of air.

Referring to FIGS. 1 to 3, the refrigerator 1 includes a body 10, storage compartments 50 and 60 formed in the body 10, and a cold air supplier to supply cold air to the storage compartments 50 and 60.

The body 10 includes an inner case 20 to form the storage compartments 50 and 60, an outer case 30 coupled to the outside of the inner case 20, to form an appearance of the refrigerator 1, and an insulator 40 foamed between the inner case 20 and the outer case 30, to insulate the storage compartments 50 and 60.

The storage compartments 50 and 60 may be partitioned into an upper refrigerating compartment 50 and a lower freezing compartment 60. Each of the refrigerating compartment 50 and freezing compartment 60 may be opened at a front side thereof. The front side of the refrigerating compartment 50 may be opened or closed by a plurality of hinge doors 80 and 81 pivotally mounted to the body 10. The front side of the freezing compartment 60 may be opened or closed by a sliding door 82 which is slidable along the freezing compartment 60.

A dispenser 90 may be provided at at least one of the hinge doors 80 and 81. The dispenser 90 allows the user to retrieve water or ice stored in the refrigerating compartment 50 from the outside of the refrigerator without opening the doors 80 and 81.

The dispenser 90 may include a discharge passage 91 connected to an ice outlet 191 of an ice bucket 190, to guide ice to an outside of the body 10, a dispenser space 92 to receive a container such as a cup in order to dispense water or ice into the container, and a lever 93 to be operated by the user, to dispense water or ice.

Meanwhile, the refrigerator 1 further includes an ice making chamber 70 partitioned from the refrigerating compartment 50, for production of ice. As shown in FIG. 3, the ice making chamber 70 may be formed between the inner case 20 and an ice making chamber case 100 coupled to an inside of the inner case 20.

In detail, the inner case 20 may include a top wall 21, opposite side walls 22 and a rear wall 23. On the other hand, the ice making chamber case 100 may include a horizontal wall 140 and a vertical wall 150. The top wall 21, one side wall 22, rear wall 23, horizontal wall 140 and vertical wall 150 may form an ice making chamber 70 which has an independent space.

An opening 29 may be formed through the rear wall 23 of the inner case 20, in order to allow a refrigerant pipe assembly 110 to be inserted into the inner case 20 from an outside of the inner case 20. In accordance with an embodiment of the present disclosure, the refrigerant pipe assembly 110 may include a refrigerant pipe 210 and a refrigerant pipe insulator 300 coupled to the refrigerant pipe 210.

For coupling of the ice making chamber case 100 to the inner case 20, the inner case 20 may include one or more engagement holes 26 and one or more first fastening holes 27, and the ice making chamber case 100 may include one or more engagement protrusions 170 formed at positions corresponding to respective engagement holes 26, and one or more second fastening holes 180 formed at positions corresponding to respective first fastening holes 27.

Thus, it may be possible to couple the ice making chamber case 100 to the inner case 20 by engaging the engagement protrusions 170 in the engagement holes 26, and fastening fastening members, such as screws, into the first and second fastening holes 27 and 180.

Grooves 28 may be formed at portions of the inner case 20 contacting ends of the ice making chamber case 100. As the ends of the ice making chamber case 100 are inserted into the grooves 28, it may be possible to enhance sealing effects between the inner case 20 and the ice making chamber case 100.

The ice making chamber case 100 also includes a front edge 160 to support the ice bucket 190 when the ice bucket 190 contacts the front edge 160. The front edge 160 includes a first edge portion 161 to contact the top wall 21 of the inner case 20, a second edge portion 162 to form a portion of the vertical wall 150, a third edge portion 163 to form a portion of the horizontal wall 140, and a fourth edge portion 164 to contact one side wall 22 of the inner case 20.

A front opening 165 is formed by inner surfaces of the first edge portion 161, second edge portion 162, third edge portion 163, and fourth edge portion 164. The front opening 165 allows the ice bucket 190 to be inserted into the ice making chamber 170.

A support case 500, which will be described later, may be coupled to the ice making chamber case 100. A support passage 510 may be formed in the support case 500. The refrigerant pipe assembly 110 may be inserted into the support passage 510, to be supported by the support passage 510. The support case 500 may include one or more fastening holes 520, to be fastened to the ice making chamber case 100 by the fastening members such as screws.

An ice making tray 196 may be disposed in the ice making chamber 70. The ice making tray 196 may have one or more ice making cells to which water is supplied, for production of ice. An ejector 197 may also be disposed in the ice making chamber 70. The ejector 197 is rotatable to release ice produced in the ice making tray 196. A drain duct 198 may also be disposed in the ice making chamber 70, to drain defrost water generated at the ice making tray 196 to an outside of the ice making chamber 70. An air passage is formed between the ice making tray 196 and the drain duct 198. The ice bucket 190 may also be disposed in the ice making chamber 70, to store ice released from the ice making tray 196. Also, an auger 192 may be disposed in the ice making chamber 70, to forwardly feed ice stored in the ice bucket 190 to the ice outlet 191. An auger motor 193 may also be disposed in the ice making chamber 70, to drive the auger 192.

The auger motor 193 constitutes an integrated auger motor assembly 199, together with an ice making chamber fan 195 to force air present in the ice making chamber 70 to flow. The auger motor assembly 199 may be disposed beneath the refrigerant pipe assembly 110 at the rear side of the refrigerant pipe assembly 110.

As described above, the refrigerant pipe 210 of the cold air supplier in the refrigerator 1 according to the illustrated embodiment of the present disclosure is partially disposed in the ice making chamber 70 such that it contacts the ice making tray 196, to directly supply cooling energy to the ice making tray 196. The ice making tray 196 may be made of a material having high thermal conductivity such as aluminum, to directly function as a heat exchanger.

As shown in FIG. 2, in accordance with an embodiment of the present disclosure, the cold air supplier may include a compressor 200 to compress a refrigerant into a high-temperature and high-pressure state, a condenser 201 to condense the refrigerant into a liquid phase, expansion devices 203 and 204 to expand the refrigerant, evaporators 234 and 244 to evaporate the refrigerant in order to generate cold air, and a refrigerant tube 210 to guide the refrigerant. The compressor 200 and condenser 201 may be disposed in a machinery chamber 71 arranged at a rear lower portion of the body 10.

In accordance with an embodiment of the present disclosure, the refrigerator 1 includes a refrigerant circulation cycle which may include two cycles established by the flow path change valve 202. That is, the refrigerant circulation cycle may include a first cycle in which the refrigerant flows toward the freezing compartment 60 after emerging from the condenser 201, and a second cycle in which the refrigerant flows the refrigerating compartment 50 and ice making chamber 70 after emerging from the condenser 201. The first and second cycles may operate in a selective manner or in a simultaneous manner.

In the first cycle, the refrigerant sequentially circulates through the compressor 200, condenser 201, flow path change valve 202, freezing compartment expansion device 203, freezing evaporator 244, and compressor 200 in this order, to supply cold air to the freezing compartment 60.

In the second cycle, the refrigerant sequentially circulates through the compressor 200, condenser 201, flow path change valve 202, refrigerating compartment expansion device 204, refrigerating compartment evaporator 234, ice making tray 196, and compressor 200 in this order, to supply cold air to the refrigerating compartment 50 and ice making chamber 70.

A freezing compartment duct 240 is provided at the freezing compartment 60. In the freezing compartment duct 240, the freezing compartment evaporator 244 is disposed. Also, a freezing compartment fan 241 is disposed in the freezing compartment duct 240. A freezing compartment outlet 242 and a freezing compartment inlet 243 are provided at the freezing compartment duct 240. Accordingly, cold air generated at the freezing compartment evaporator 244 is discharged into the freezing compartment 60 through the freezing compartment outlet 242. After cooling the freezing compartment 60, the cold air is again sucked into the freezing compartment inlet 243.

Similarly, a refrigerating compartment duct 230 is provided at the refrigerating compartment 50. In the refrigerating compartment duct 230, the refrigerating compartment evaporator 234 is disposed. Also, a refrigerating compartment fan 231 is disposed in the refrigerating compartment duct 230. A refrigerating compartment outlet 232 and a refrigerating compartment inlet 233 are provided at the refrigerating compartment duct 230. Accordingly, cold air generated at the refrigerating compartment evaporator 234 is discharged into the refrigerating compartment 50 through the refrigerating compartment outlet 232. After cooling the refrigerating compartment 50, the cold air is again sucked into the refrigerating compartment inlet 233.

In the ice making chamber 70, the above-described drain duct 198 and ice making chamber fan 195 are disposed. The ice making chamber fan 195 is arranged at a rear lower portion of the ice making chamber 70 such that it sucks air from a front side thereof, and upwardly discharges the sucked air. The air discharged from the ice making chamber fan 195 may be forwardly guided by a guide 350 of the refrigerant pipe insulator 300 which will be described later. The forwardly-guided air exchanges heat with the ice making tray 196 and the ice making chamber-side portion of the refrigerant pipe 210 while passing through a space defined between the ice making tray 196 and the drain duct 198. The air is then again sucked into the ice making chamber fan 195 after flowing to the ice outlet 191 of the ice bucket 190.

In particular, a cold air guide 190a may be provided at the ice bucket 190, to guide air emerging from the space between the ice making tray 196 and the drain duct 198 to the ice outlet 191 of the ice bucket 190 while preventing the air from flowing downwards directly.

Since air circulates in the ice making chamber 70, as described above, it may be possible to enhance the thermal efficiencies of the ice making tray 196 and ice making chamber-side portion of the refrigerant pipe 210. Ice stored in the ice bucket 190 may also be kept at a desired temperature.

The refrigerant pipe insulator 300 is coupled to the refrigerant pipe 210 in order to prevent formation of frost on the refrigerant pipe 210 due to a temperature difference between the refrigerant pipe 210 and ambient air. In the refrigerator 1 according to the illustrated embodiment of the present disclosure, the refrigerant pipe insulator 300 not only functions to insulate the refrigerant pipe 210, but also functions to fix the refrigerant pipe 210 to the ice making chamber 70. Hereinafter, a structure of assembling the refrigerant pipe 210 to the ice making chamber 70 will be described.

Figure 4:
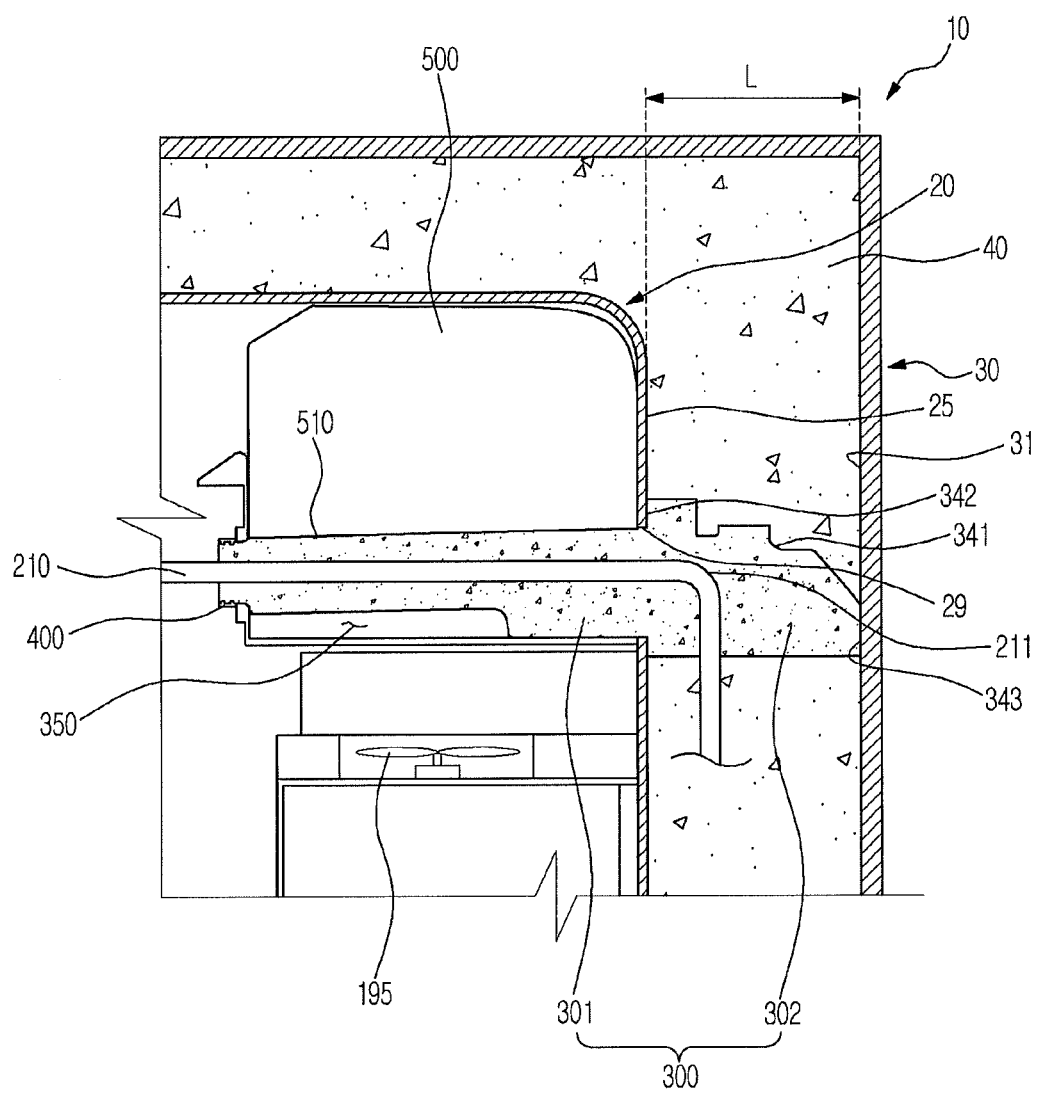
FIG. 4 is a sectional view illustrating an assembly structure of a refrigerant pipe assembly in the refrigerator of FIG. 1.
Figure 5:
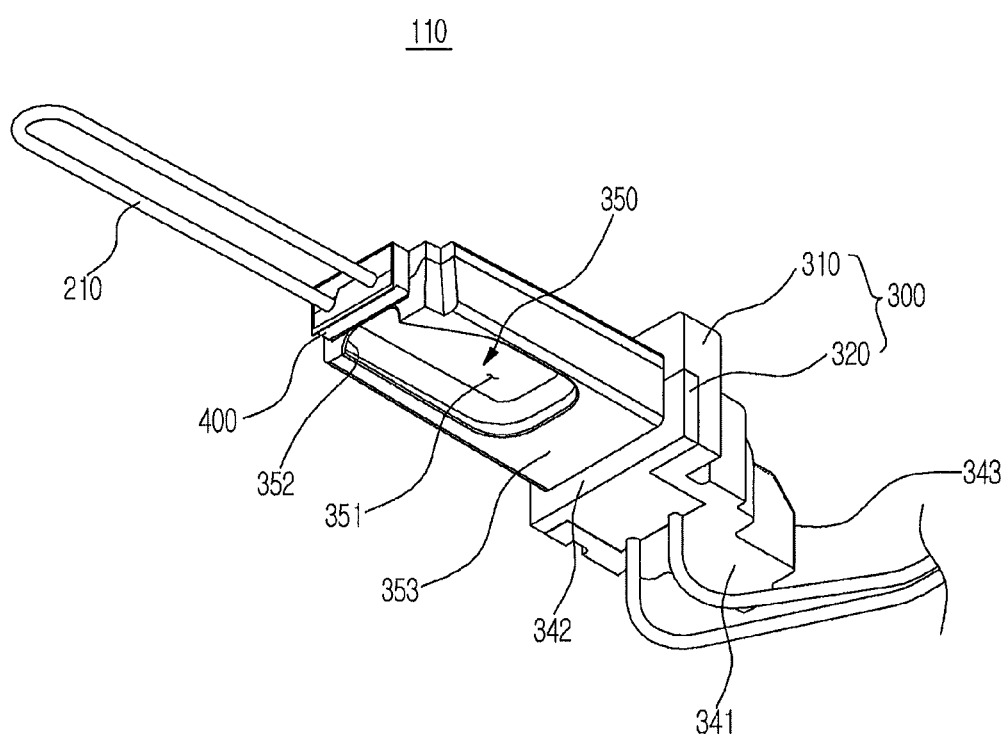
FIG. 5 is a perspective view illustrating the refrigerant pipe assembly in the refrigerator of FIG. 1.
Figure 6:
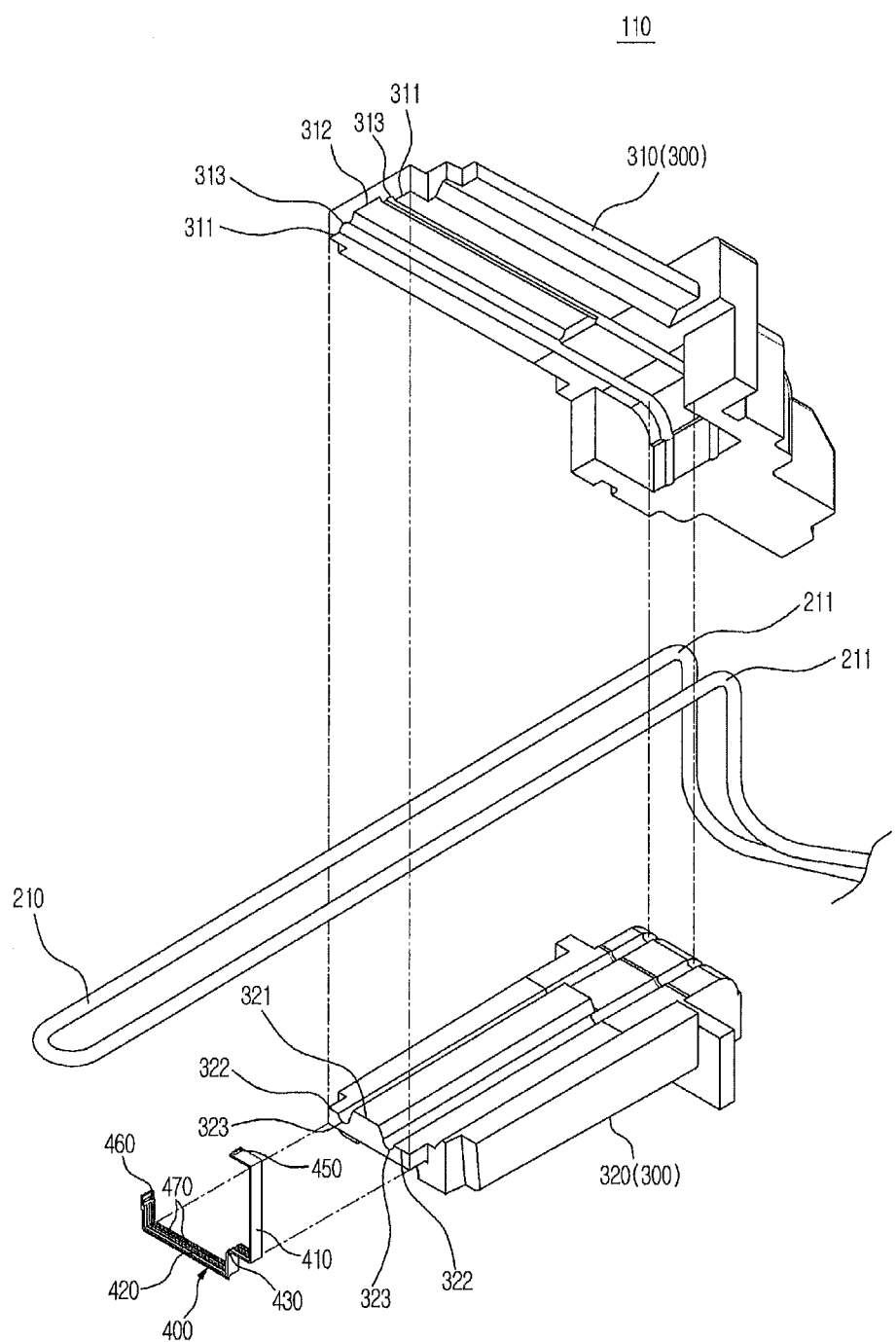
FIG. 6 is an exploded perspective view illustrating the refrigerant pipe assembly in the refrigerator of FIG. 1.

FIG. 4 is a sectional view illustrating an assembly structure of the refrigerant pipe assembly in the refrigerator of FIG. 1. FIG. 5 is a perspective view illustrating the refrigerant pipe assembly in the refrigerator of FIG. 1. FIG. 6 is an exploded perspective view illustrating the refrigerant pipe assembly in the refrigerator of FIG. 1.

Referring to FIGS. 4 to 6, the refrigerant pipe assembly 110 includes the refrigerant pipe insulator 300 which is coupled to the refrigerant pipe 210, to insulate the refrigerant pipe 210. The refrigerant pipe insulator 300 may be made of an insulating material such as a polystyrene which is lightweight while exhibiting excellent insulation performance.

The refrigerant pipe insulator 300 is coupled to the refrigerant pipe 210 in such a manner that it encloses the refrigerant pipe 210. In order to achieve easy assembly of the refrigerant pipe insulator 300 to the refrigerant pipe 210, the refrigerant pipe insulator 300 may have a divided structure including a plurality of coupled insulator sections, namely, a first insulator section 310 and a second insulator section 320.

The first insulator section 310 is coupled to a top portion of the second insulator section 320. A first accommodation groove 313 may be formed on an outer peripheral surface of the first insulator section 310, to accommodate the refrigerant tube 210. At a position corresponding to the first accommodation groove 313, a second accommodation groove 323 may be formed on an outer peripheral surface of the second insulator section 320. Thus, the first and second accommodation grooves 313 and 323 may form an accommodation space to accommodate the refrigerant pipe 210.

In accordance with the above-described structure, it may be possible to easily assembly the refrigerant pipe assembly 110 by accommodating the refrigerant pipe 210 in the second accommodation grove 323 of the second insulator section 320, and then coupling the first insulating portion 310 to the top portion of the second insulator section 320.

The first insulator section 310 may include a first convex portion 311 which is outwardly protruded, and a first concave portion 312 which is inwardly recessed. Also, the second insulator section 320 may include a second concave portion 322 formed at a position corresponding to the first convex portion 311, and a second convex portion 321 formed at a position corresponding to the first concave portion 312. Accordingly, the first and second insulator sections 310 and 320 are coupled through a stepped structure formed in accordance with engagement of the first convex portion 311 in the second concave portion 322 and engagement of the second convex portion 321 in the first concave portion 312. Thus, the contact force between the first and second insulator sections 310 and 320 may be enhanced.

The guide 350, which guides flow of air, as described above, may be formed at a bottom portion of the second insulator section 320. The guide 350 may include a guide space 351 (FIG. 5) inwardly recessed from a lower surface 353 (FIG. 5) of the second insulator section 320, and a front outlet 352 (FIG. 5) formed at a front side of the guide space 351. Air introduced into the guide space 351 may be forwardly guided through the front outlet 352.

The refrigerant pipe assembly 110 may further include a loop-shaped clamp member 400 fitted around front ends of the first and second insulator sections 310 and 320. The clamp member 400 may be fitted around the outer peripheral surface of the refrigerant pipe insulator 300 in the form of a loop, thereby preventing the first and second insulator sections 310 and 320 from being spaced apart from each other. Although, as a non-limiting example, only one clamp member is shown in FIG. 6, the number of clamp members may be more than one clam members. Further, as a non-limiting example, the clamp member is fitted around the front ends of the first and second insulator sections 310 and 320, the clamp member may be fitted any other portion of the first and second insulator sections.

The clamp member 400 may include a first support portion 410 to support the first insulator section 310, a second support portion 420 to support the second insulator portion 320, and a hinge 430 provided between the first and second support portions 410 and 420.

The first and second support portions 410 and 420 may be foldable about the hinge 430. An engagement protrusion 450 may be formed at one end of the first support portion 410, and an engagement hole 460 may be formed at one end of the second support portion 420, to receive the engagement protrusion 450. The first and second support portions 410 and 420 may be kept in a folded state when the engagement protrusion 450 is received in the engagement hole 460. Contact ridges 470 may be protruded from an inner surface of the clamp member 400, to enhance the contact force between the clamp member 400 and the refrigerant pipe insulator 300.

Meanwhile, the refrigerant pipe 210 may include one or more bent portions 211. The refrigerant pipe insulator 300 is coupled to the refrigerant pipe 210 while enclosing the bent portions 211. Accordingly, the refrigerant pipe 210 of the refrigerant pipe assembly 110 may be prevented from moving relative to the refrigerant pipe insulator 300.

The refrigerant pipe assembly 110 assembled as described above may be inserted into the ice making chamber 70 defined in the inner case 20 in an inward direction from the outside of the inner case 20. In this case, a portion 301 of the refrigerant pipe insulator 300 may be disposed at the inside of the inner case 20, whereas the remaining portion 302 of the refrigerant pipe insulator 300 may be disposed at the outside of the inner case 20. Here, the portion 301 (FIG. 4) of the refrigerant pipe insulator 300 disposed at the inside of the inner case 20 will be referred to as an inserted portion 301 (FIG. 4), and the remaining portion 302 of the refrigerant pipe insulator 300 disposed at the outside of the inner case 20 will be referred to as a fixed portion 302 (FIG. 4).

The fixed portion 302 may be supported by the body insulator 40 which is foamed between the inner case 20 and the outer case 30. That is, supporting of the fixed portion 302 by the body insulator 40 may be achieved by placing the refrigerant assembly 110, coupling the outer case 30 to the outside of the inner case 20, and then foaming the body insulator 40 between the inner case 20 and the outer case 30. The body insulator 40 may be formed by filling a space between the coupled inner and outer cases 20 and 30 with a foaming agent and expanding the foaming agent.

The refrigerant pipe assembly 110 may be fixed in accordance with supporting of the fixed portion 302 by the body insulator 40. Here, the outer surface of the fixed portion 302 supported by the body insulator 40 will be referred to as a first support surface 341.

The fixed portion 302 may also include a second support surface 342 supported by an outer surface 25 of the inner case 20 around the opening 29. Thus, the fixed portion 302 is supported by the outer surface 25 of the inner case 20 around the opening 29.

The fixed portion 302 may have a length L corresponding to the distance between the outer surface 25 of the inner case 20 and an inner surface 31 of the outer case 30. The fixed portion 302 may further include a third support surface 343 supported by the inner surface 31 of the outer case 30.

Accordingly, when the outer case 30 is coupled to the outside of the inner case 20, the fixed portion 302 is tightly interposed between the outer surface 25 of the inner case 20 and the inner surface 31 of the outer case 30 and, as such, the fixed portion 302 is kept in position during foaming of the body insulator 40 between the inner case 20 and the outer case 30.

Also, since the fixed portion 302 is in close contact with the outer surface 25 of the inner case 20, it may be possible to prevent a liquid foaming agent from penetrating into the inner case 20 during foaming of the body insulator 40 between the inner case 20 and the outer case 30.

Even after completion of foaming, the fixed portion 302 may be kept in a firmly fixed state because it is supported not only by the body insulator 40, but also by the outer surface 25 of the inner case 20 and the inner surface 31 of the outer case 30.

Figure 7:
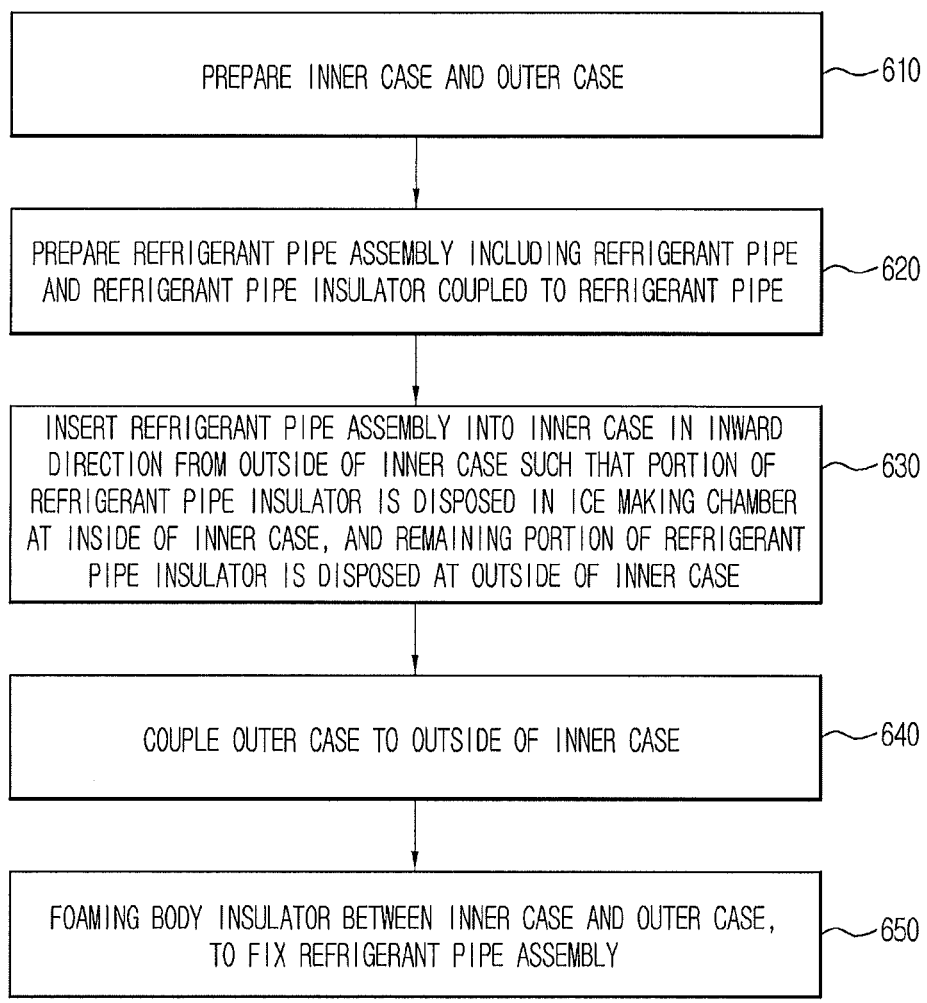
FIG. 7 is a flowchart illustrating a refrigerant pipe assembly method of the refrigerator shown in FIG. 1.

FIG. 7 is a flowchart illustrating a refrigerant pipe assembly method of the refrigerator shown in FIG. 1. Hereinafter, a refrigerant pipe assembly method according to an embodiment of the present disclosure will be described with reference to FIGS. 1 to 7.

First, the inner case 20 and outer case 30 are prepared (610). In this case, the opening 29 is formed through the rear wall 23 of the inner case 20, to allow the refrigerant pipe assembly 110 to pass through the opening 29.

Thereafter, the refrigerant pipe assembly 110 is assembled (620). Assembly of the refrigerant pipe assembly 110 may be achieved by sequentially coupling the first insulator section 310, refrigerant pipe 210 and second insulator section 320. In this case, the bent portions 211 of the refrigerant pipe 210 are interposed between the first and second insulator sections 310 and 320 while being enclosed by the first and second insulator sections 310 and 320 and, as such, the refrigerant pipe 210 is fixed by the first and second insulator sections 310 and 320. In this regard, it may be possible to adjust the length of the refrigerant pipe 210 contacting the ice making tray 196 during assembly of the refrigerant pipe assembly 110.

Subsequently, the refrigerant pipe assembly 110 is inserted into the inner case 20 in an inward direction from the outside of the inner case 20 through the opening 29 of the inner case 20 (630). In this case, since the second support surface 342 of the refrigerant pipe insulator 300 is supported by the outer surface 25 of the inner case 20 around the opening 29, the portion 310 of the refrigerant pipe insulator 300 may be disposed at the inside of the inner case 20, and the remaining portion 302 of the refrigerant pipe insulator 300 may be disposed at the outside of the inner case 20.

The outer case 30 is then coupled to the outside of the inner case 20 (640). In this case, since the length L of the fixed portion 302 of the refrigerant pipe insulator 300 corresponds to the distance between the outer surface 25 of the inner case 20 and the inner surface 31 of the outer case 30, the refrigerant tube insulator 300 may be supported by the inner surface 31 of the outer case 30.

Thereafter, the body insulator 40 is foamed between the inner case 20 and the outer case 30 (650). The fixed portion 302 of the refrigerant pipe insulator 300 is supported by the foamed body insulator 40 and, as such, the refrigerant pipe insulator 300 may be fixed. Since the refrigerant insulator 300 is kept in a state of being supported by the outer surface 25 of the inner case 20 and the inner surface 31 of the outer case 30 during foaming of the body insulator 40, it may be possible to prevent the refrigerant pipe insulator 300 from moving from an original position due to the liquid foaming agent. The body insulator 40 may be formed by filling a space between the coupled inner and outer cases 20 and 30 with a foaming agent and expanding the foaming agent.

Since the refrigerant pipe insulator 300 is coupled to the refrigerant pipe 210 in accordance with the above-described method, it may be possible to firmly fix the refrigerant tube 210 to the inside of the ice making chamber 70 while reliably insulating the refrigerant pipe 210.

As apparent from the above description, in accordance with embodiments of the present disclosure, it may be possible to firmly fix the refrigerant pipe which is disposed in the ice making chamber, using the refrigerant pipe insulator.

The refrigerant pipe insulator is firmly supported by the body insulator foamed between the inner case and the outer case and, as such, the refrigerant pipe insulator is firmly fixed.

The refrigerant pipe insulator is constituted by a plurality of assembled insulator sections. The refrigerant pipe is interposed between the insulator sections. Thus, assembly of the refrigerant pipe assembly may be easily achieved.

The clamp member is fitted around the front end of the refrigerant pipe insulator, thereby preventing the insulator sections from being spaced apart from each other. Also, the rear end of the refrigerant pipe insulator is supported by the body insulator. Thus, the refrigerant pipe insulator may be firmly fixed through a simple structure.

The refrigerant pipe includes one or more bent portions supported by the refrigerant pipe insulator while being enclosed by the refrigerant pipe insulator. Accordingly, it may be possible to prevent the refrigerant pipe from moving relative to the refrigerant pipe insulator.

Assembly of the refrigerant pipe assembly may be carried out before foaming of the body insulator.

Also, the insertion length of the refrigerant pipe may be easily determined during assembly of the refrigerant pipe assembly.

Additionally, the refrigerant insulator is supported not only by the body insulator, but also by the outer surface of the inner case and the inner case of the outer case. Accordingly, it may be possible to prevent the refrigerant pipe insulator from moving from an original position before or after foaming of the body insulator.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of manufacturing a refrigerator, comprising:
preparing an inner case including an ice making chamber and an opening formed through at least a wall of the inner case and communicating with the ice making chamber;
preparing an outer case to be coupled to an outside of the inner case;
preparing a refrigerant pipe assembly including a refrigerant pipe having a section that is disposed in the ice making chamber so as to supply cooling energy to the ice making chamber, and a refrigerant pipe insulator including a first insulator section and a second insulator section which together insulate at least some of the section of the refrigerant pipe which is disposed in the ice making chamber;
inserting the refrigerant pipe assembly into the opening of the inner case in an inward direction from the outside of the inner case such that a portion of the refrigerant pipe insulator is disposed in the ice making chamber, and a remaining portion of the refrigerant pipe insulator is disposed between the inner case and the outer case; and
foaming a body insulator between the inner case and the outer case, thereby supporting the remaining portion of the refrigerant pipe insulator by the body insulator and,
wherein the preparing of the refrigerant pipe insulator comprises:
preparing the first insulator section of the refrigerant pipe insulator and the second insulator section of the refrigerant pipe insulator to be coupled to the first insulator section so as to form the refrigerant pipe insulator;
arranging the refrigerant pipe between the first insulator section and the second insulator section; and
coupling the first insulator section and the second insulator section together using at least one clamp member, the at least one clamp member being placed at an end of both the first insulator section and the second insulator section where the refrigerant pipe protrudes from the at least one clamp member into the ice making chamber.

2. The method according to claim 1,
wherein the inserting of the refrigerant pipe assembly into the opening further includes inserting a portion of the first insulator section through the opening of the inner case and inserting a portion of the second insulator section through the opening of the inner case.

3. The method according to claim 1, wherein the refrigerant pipe insulator is supported by at least one of an outer surface of the inner case around the opening.

4. The method according to claim 1,
wherein the refrigerant pipe insulator is made of polystyrene to insulate the refrigerant pipe, and
wherein a portion of the refrigerant pipe insulator is inserted into the opening of the inner case.

5. The method according to claim 1, wherein the first insulator section of the refrigerant pipe insulator surrounds a portion of an outer circumference of the refrigerant pipe while the second insulator section of the refrigerant pipe insulator surrounds another portion of the outer circumference of the refrigerant pipe.

* * * * *